(12) United States Patent
Hirabayashi

(10) Patent No.: US 9,111,196 B2
(45) Date of Patent: Aug. 18, 2015

(54) IMAGE FORMING APPARATUS AND IMAGE FORMING METHOD

(71) Applicant: CANON KABUSHIKI KAISHA, Tokyo (JP)

(72) Inventor: Jun Hirabayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/091,591

(22) Filed: Nov. 27, 2013

(65) Prior Publication Data

US 2014/0153011 A1  Jun. 5, 2014

(30) Foreign Application Priority Data

Nov. 30, 2012 (JP) ................................ 2012-263130

(51) Int. Cl.
| | | |
|---|---|---|
| G06T 5/00 | (2006.01) |
| H04N 1/60 | (2006.01) |
| H04N 1/46 | (2006.01) |
| G06K 9/00 | (2006.01) |
| G06K 15/12 | (2006.01) |
| H04N 1/053 | (2006.01) |
| H04N 1/113 | (2006.01) |
| H04N 1/12 | (2006.01) |

(52) U.S. Cl.
CPC .......... *G06K 15/1223* (2013.01); *G06K 15/128* (2013.01); *H04N 1/053* (2013.01); *H04N 1/1135* (2013.01); *H04N 1/12* (2013.01); *H04N 2201/0082* (2013.01); *H04N 2201/04787* (2013.01); *H04N 2201/04793* (2013.01); *H04N 2201/04798* (2013.01)

(58) Field of Classification Search
None
See application file for complete search history.

(56) References Cited

U.S. PATENT DOCUMENTS

| | | | | |
|---|---|---|---|---|
| 5,896,489 | A * | 4/1999 | Wada ............................. 358/1.2 |
| 6,608,941 | B1 * | 8/2003 | Suzuki et al. ................. 382/272 |
| 8,159,722 | B2 * | 4/2012 | Higashiyama et al. ...... 358/3.26 |
| 8,493,613 | B2 * | 7/2013 | Kaima ........................... 358/1.2 |
| 2002/0126315 | A1 * | 9/2002 | Nabeshima ................. 358/3.03 |
| 2004/0257311 | A1 * | 12/2004 | Kanai et al. .................. 345/75.2 |
| 2005/0195442 | A1 * | 9/2005 | Inoue et al. .................. 358/3.14 |
| 2006/0082574 | A1 * | 4/2006 | Tsubaki ........................ 345/419 |
| 2008/0012969 | A1 * | 1/2008 | Kasai et al. .................. 348/266 |
| 2008/0285069 | A1 * | 11/2008 | Yasuda ........................ 358/1.15 |
| 2009/0022421 | A1 * | 1/2009 | Uyttendaele et al. ......... 382/284 |

(Continued)

FOREIGN PATENT DOCUMENTS

JP            2001-5245 A        1/2001

*Primary Examiner* — Madelein Nguyen
(74) *Attorney, Agent, or Firm* — Canon USA, Inc. IP Division

(57) ABSTRACT

A device for controlling an image forming apparatus includes an acquisition unit configured to acquire image data, and pixel piece insertion/extraction information indicating whether a pixel piece needs to be inserted into or extracted from each pixel of the image data, a generation unit configured to generate an exposure signal according to a pixel value indicating a pixel of interest in the image data and to pixel piece insertion/extraction information on the pixel of interest, and a control unit configured to control exposure by the apparatus according to the exposure signal. The generation unit causes the pixel of interest to be formed by a plurality of pixel pieces arranged in a direction in which the apparatus scans, presets at least one of the pixel pieces as an adjustment blank pixel piece, and deletes the piece when the width of the pixel of interest in the scanning direction is reduced.

13 Claims, 13 Drawing Sheets

(56) References Cited

U.S. PATENT DOCUMENTS

| | | | |
|---|---|---|---|
| 2009/0066981 A1* | 3/2009 | Kaima et al. | 358/1.9 |
| 2010/0097623 A1* | 4/2010 | Ooya | 358/1.9 |
| 2010/0124380 A1* | 5/2010 | Shiraishi et al. | 382/239 |
| 2010/0253981 A1* | 10/2010 | Higashiyama et al. | 358/3.26 |
| 2010/0253985 A1* | 10/2010 | Kurimoto | 358/505 |
| 2011/0063349 A1* | 3/2011 | Koase | 347/9 |
| 2011/0299767 A1* | 12/2011 | Ichikawa | 382/162 |
| 2011/0310440 A1* | 12/2011 | Okada et al. | 358/3.26 |
| 2012/0170664 A1* | 7/2012 | Hasui | 375/240.24 |
| 2013/0063623 A1* | 3/2013 | Kawaguchi et al. | 348/224.1 |
| 2013/0223683 A1* | 8/2013 | Jiang et al. | 382/103 |
| 2013/0286133 A1* | 10/2013 | Furuta et al. | 347/118 |
| 2014/0092273 A1* | 4/2014 | Mizoguchi et al. | 348/222.1 |

\* cited by examiner

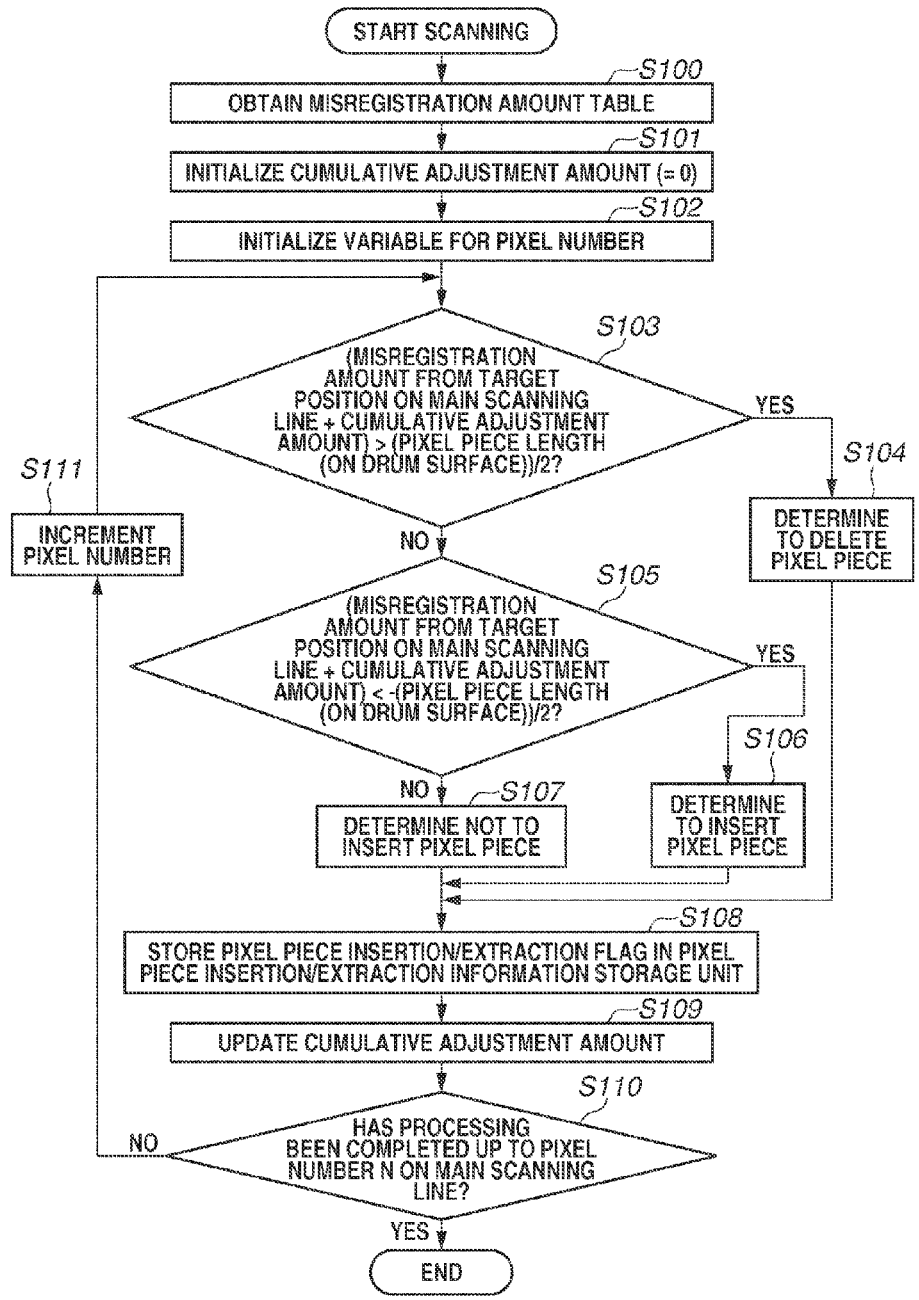

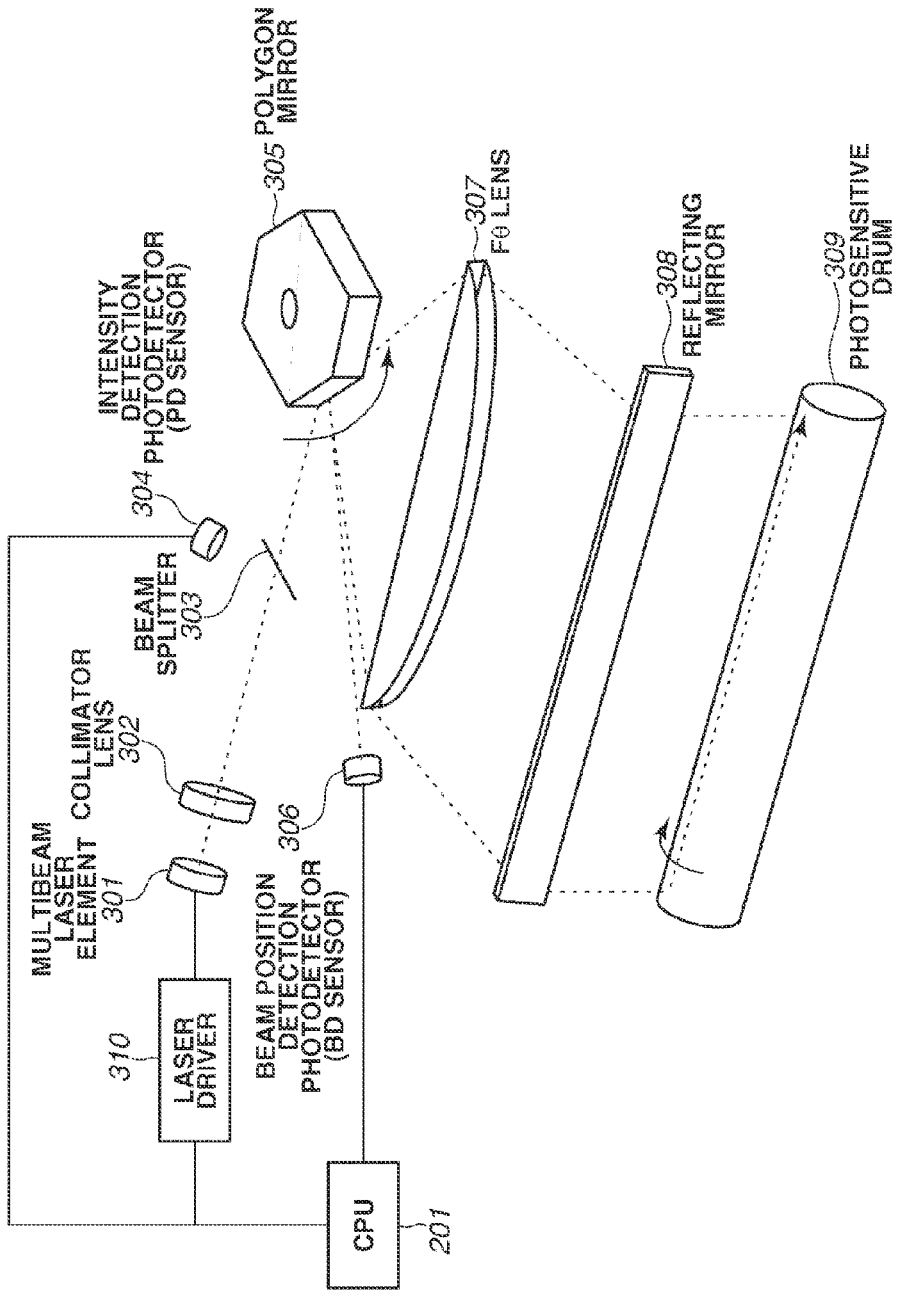

FIG.8A

REGION WHERE SCANNING LINE IS EXTENDED

"PIXEL" DIVISION (ex.1200 dpi 1pixel)

CUMULATIVE LIGHT AMOUNT → ADJUST TO PREDETERMINED VALUE

AFTER PIXEL PIECE INSERTION/ EXTRACTION CONTROL

EXTRACT PIXEL PIECE

LIGHT AT 100% = LIGHT 4 PIXEL PIECES

| PIXEL VALUE | 0/5 | 1/5 | 2/5 | 3/5 | 4/5 | 5/5 |
|---|---|---|---|---|---|---|
| LIT PIXEL PIECES | 0 | 1 | 2 | 3 | 4 | 4 |
| EXPOSURE INTENSITY | 0.0 | 0.25 | 0.5 | 0.75 | 1.0 | 1.0 |

FIG.8B

REGION WHERE SCANNING LINE IS OF EQUAL MAGNIFICATION

CUMULATIVE LIGHT AMOUNT → ADJUST TO PREDETERMINED VALUE

LIGHT AT 100% = LIGHT 5 PIXEL PIECES

| PIXEL VALUE | 0/5 | 1/5 | 2/5 | 3/5 | 4/5 | 5/5 |
|---|---|---|---|---|---|---|
| LIT PIXEL PIECES | 0 | 1 | 2 | 3 | 4 | 5 |
| EXPOSURE INTENSITY | 0.0 | 0.2 | 0.4 | 0.6 | 0.8 | 1.0 |

FIG.8C

REGION WHERE SCANNING LINE IS REDUCED

CUMULATIVE LIGHT AMOUNT → ADJUST TO PREDETERMINED VALUE

INSERT PIXEL PIECE

LIGHT AT 100% = LIGHT 6 PIXEL PIECES

| PIXEL VALUE | 0/5 | 1/5 | 2/5 | 3/5 | 4/5 | 5/5 |
|---|---|---|---|---|---|---|
| LIT PIXEL PIECES | 0 | 1 | 2 | 3 | 4 | 6 |
| EXPOSURE INTENSITY | 0.0 | 0.17 | 0.33 | 0.5 | 0.66 | 1.0 |

EXPOSURE INTENSITY DIFFERS AT EACH POSITION AND AT EACH PIXEL VALUE

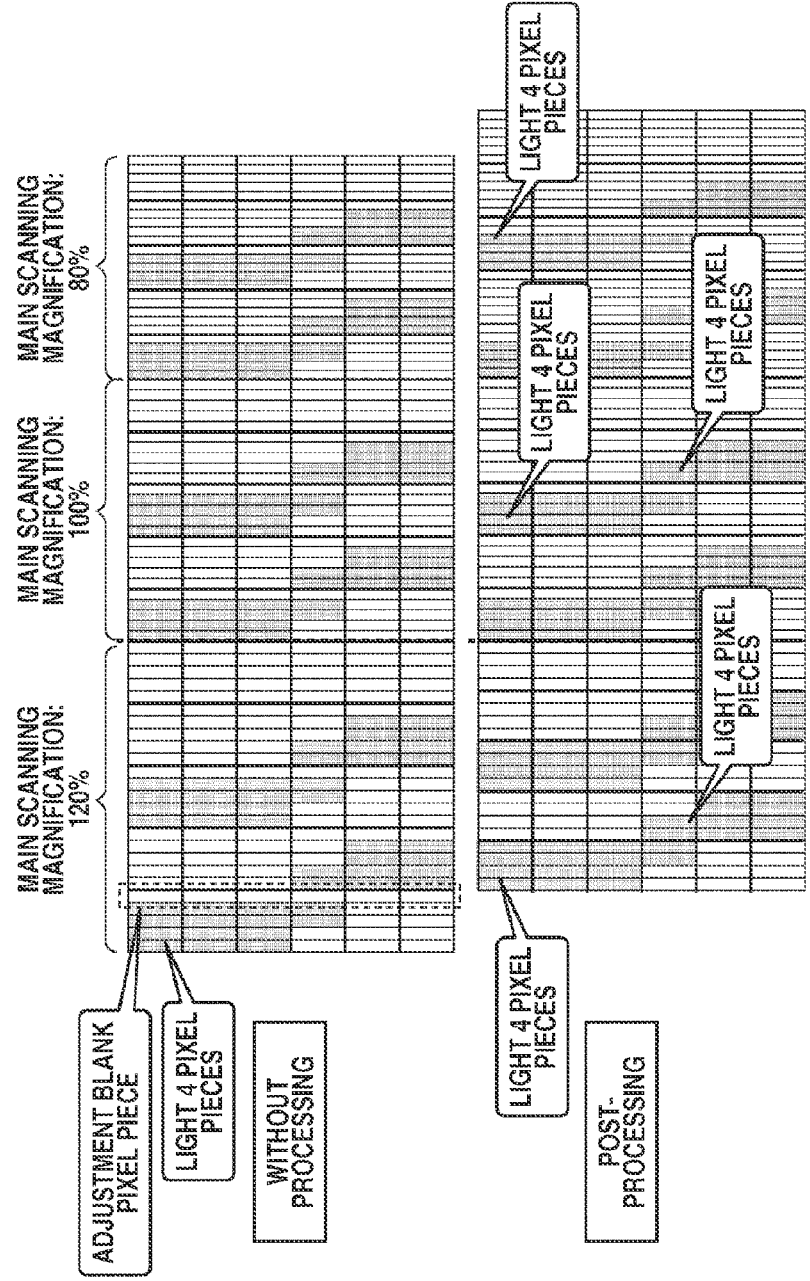

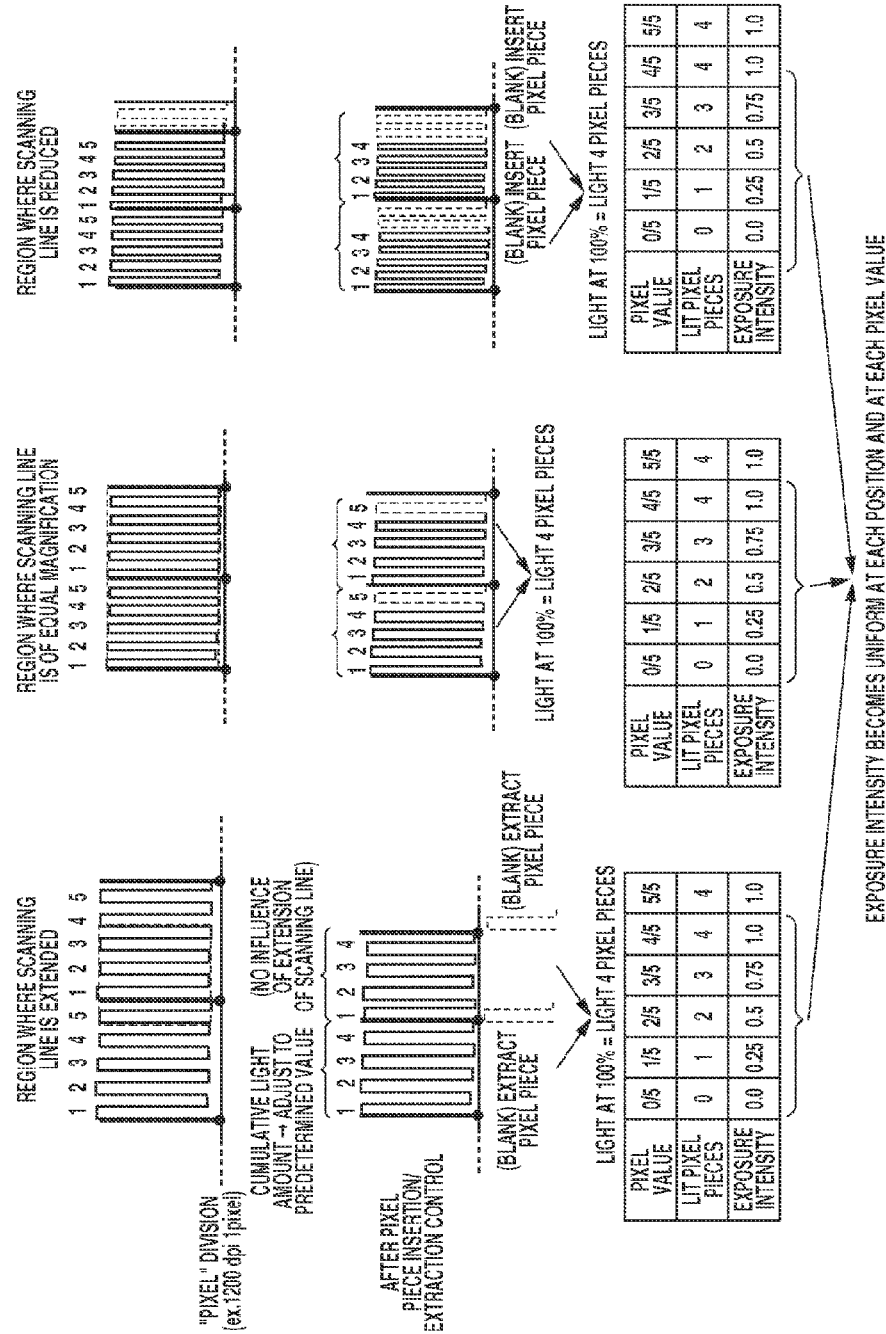

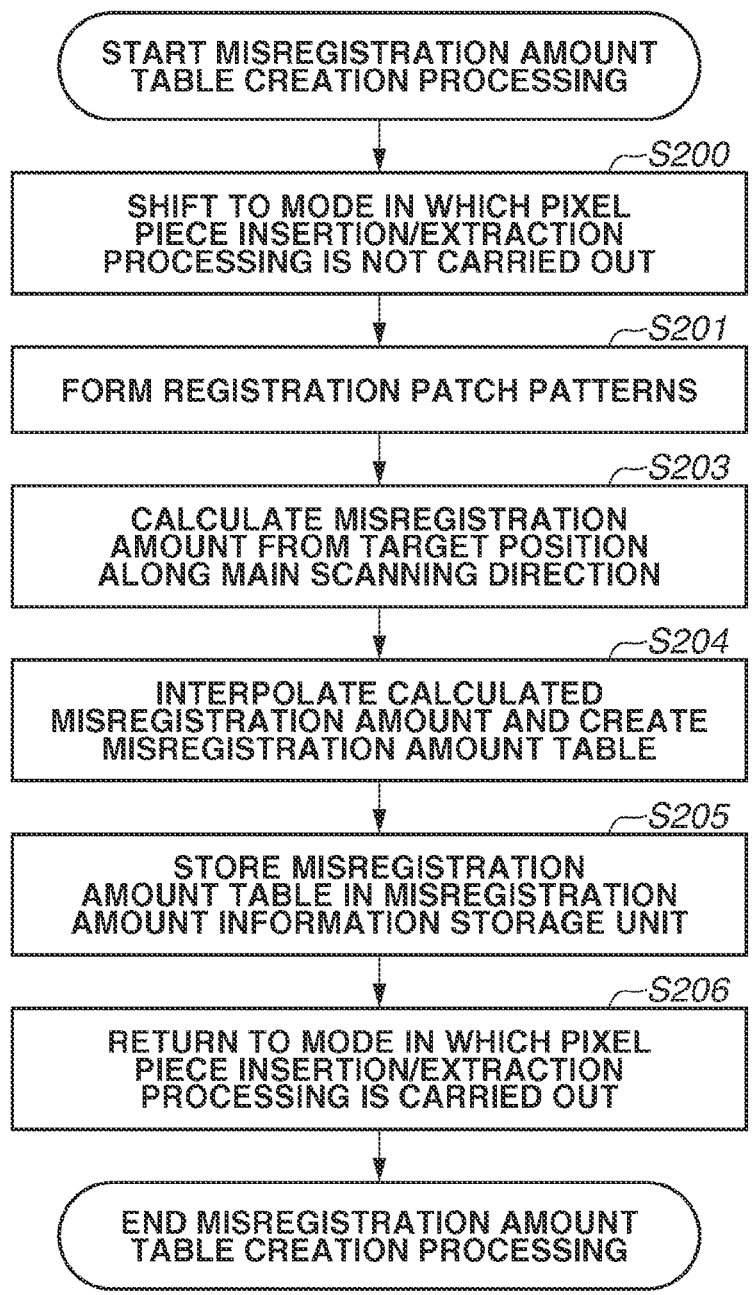

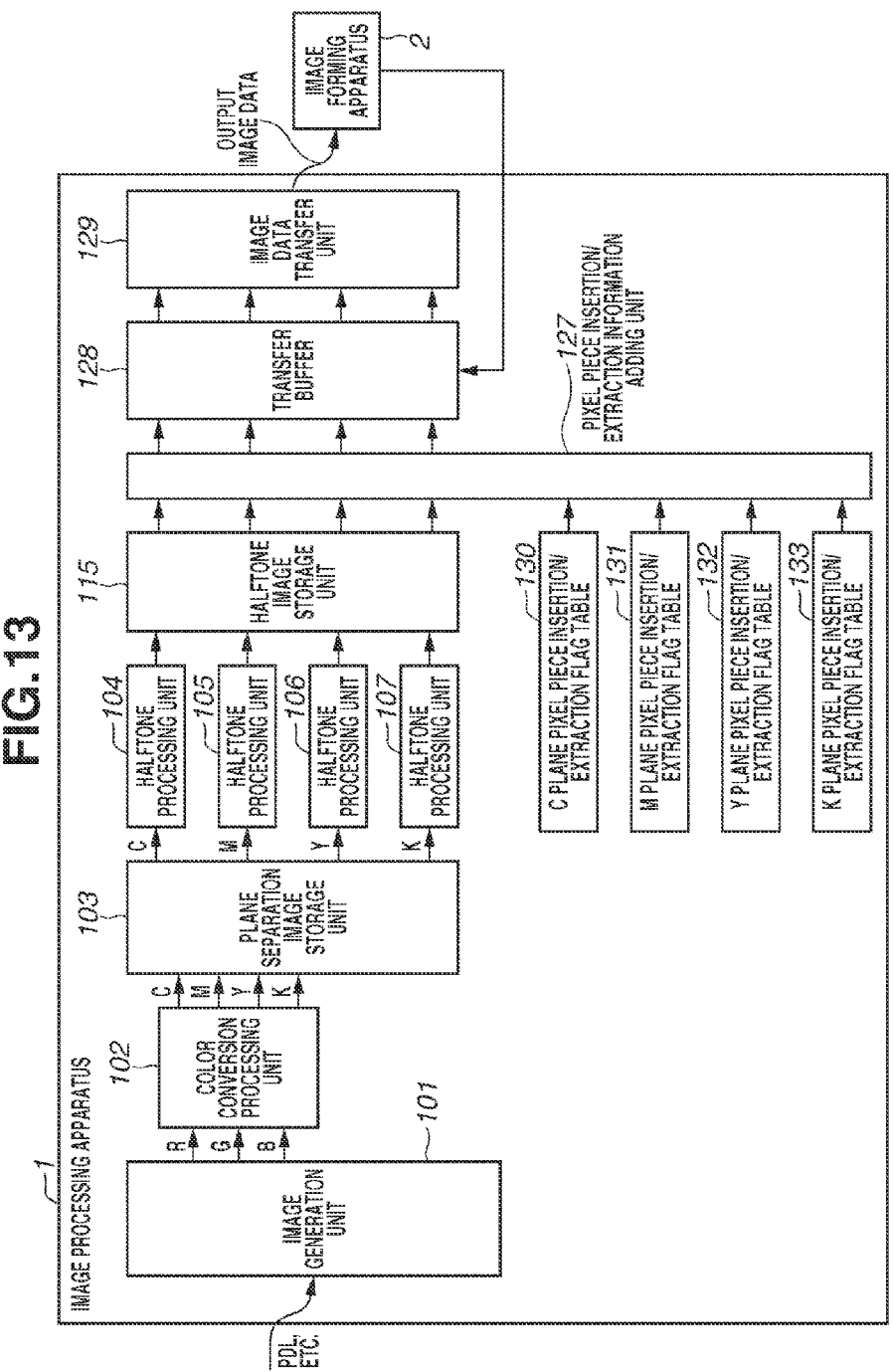

IMAGE FORMING APPARATUS AND IMAGE FORMING METHOD

BACKGROUND OF THE INVENTION

1. Field of the Invention

One disclosed aspect of the embodiments relates to an image forming apparatus which employs an electrophotographic process.

2. Description of the Related Art

A tandem type image forming apparatus which employs an electrophotographic process is known. In the tandem type image forming apparatus, image forming units are provided to independently form toner images in respective colors, and the formed color toner images are sequentially transferred to be superimposed on one another to form a color image. In the tandem type image forming apparatus, an optical magnification in a main scanning direction (hereinafter, main scanning magnification) may differ among the respective colors, so that color misregistration may occur.

Japanese Patent Application Laid-Open No. 2001-5245 discusses a method for correcting such variations in the main scanning magnification by inserting or deleting into or from image data a pixel or a resolved pixel having a resolution equal to or higher than the resolution of the image data (hereinafter, referred to as a "pixel piece"). More specifically, if the main scanning magnification is less than an appropriate value (i.e., if the width in the main scanning direction is reduced), a pixel or a pixel piece is inserted according to the reduction rate. Meanwhile, if the main scanning magnification is greater than the appropriate value (i.e., if the width in the main scanning direction is expanded), a pixel or a pixel piece is deleted according to the expansion rate.

In such a method for correcting the main scanning magnification by inserting or deleting a pixel or a pixel piece, however, interference may occur between the pattern of positions into or from which the pixel or the pixel piece is inserted or extracted and the screen pattern or the image data pattern, which in turn may result in moire.

SUMMARY OF THE INVENTION

One disclosed aspect of the embodiments is directed to correcting a main scanning magnification of image data without generating moire in forming an image.

According to an aspect of the embodiments, a control device for controlling an image forming apparatus configured to form an image includes an acquisition unit configured to acquire image data formed by pixels each including a plurality of pixel pieces, and pixel piece insertion/extraction information indicating whether a pixel piece needs to be inserted into or extracted from each pixel of the image data, a generation unit configured to generate an exposure signal to be used by the image forming apparatus to carry out an exposure, according to a pixel value indicating a pixel of interest in the image data and to pixel piece insertion/extraction information on the pixel of interest, and a control unit configured to control exposure by the image forming apparatus according to the exposure signal. The generation unit causes the pixel of interest to be formed by a plurality of pixel pieces arranged in a direction in which the image forming apparatus performs exposure scanning, presets at least one of the plurality of pixel pieces as an adjustment pixel piece that stays blank, and extracts the adjustment pixel piece when the width of the pixel of interest in the scanning direction is to be reduced.

Further features of the disclosure will become apparent from the following description of exemplary embodiments (with reference to the attached drawings).

BRIEF DESCRIPTION OF THE DRAWINGS

FIG. 3 is a flowchart of adjustment blank pixel piece insertion/extraction determination processing.

FIG. 5 illustrates a schematic of an optical system in the image forming apparatus.

FIGS. 8A to 8C are schematic diagrams for describing a relationship between a pixel value and exposure intensity when a pixel piece is inserted or extracted without an adjustment blank pixel piece being prepared.

FIG. 9 schematically illustrates a processing result obtained when a pixel piece is inserted or extracted with an adjustment blank pixel piece being provided.

FIG. 10 is a schematic diagram for describing a relationship between a pixel value and exposure intensity when a pixel piece is inserted or extracted with an adjustment blank pixel piece being provided.

FIG. 12 is a flowchart of processing for dynamically creating a misregistration amount table.

FIG. 13 is a block diagram illustrating a configuration of an image processing apparatus in detail.

DESCRIPTION OF THE EMBODIMENTS

Various exemplary embodiments, features, and aspects of the disclosure will be described in detail below with reference to the drawings.

Figure 1:
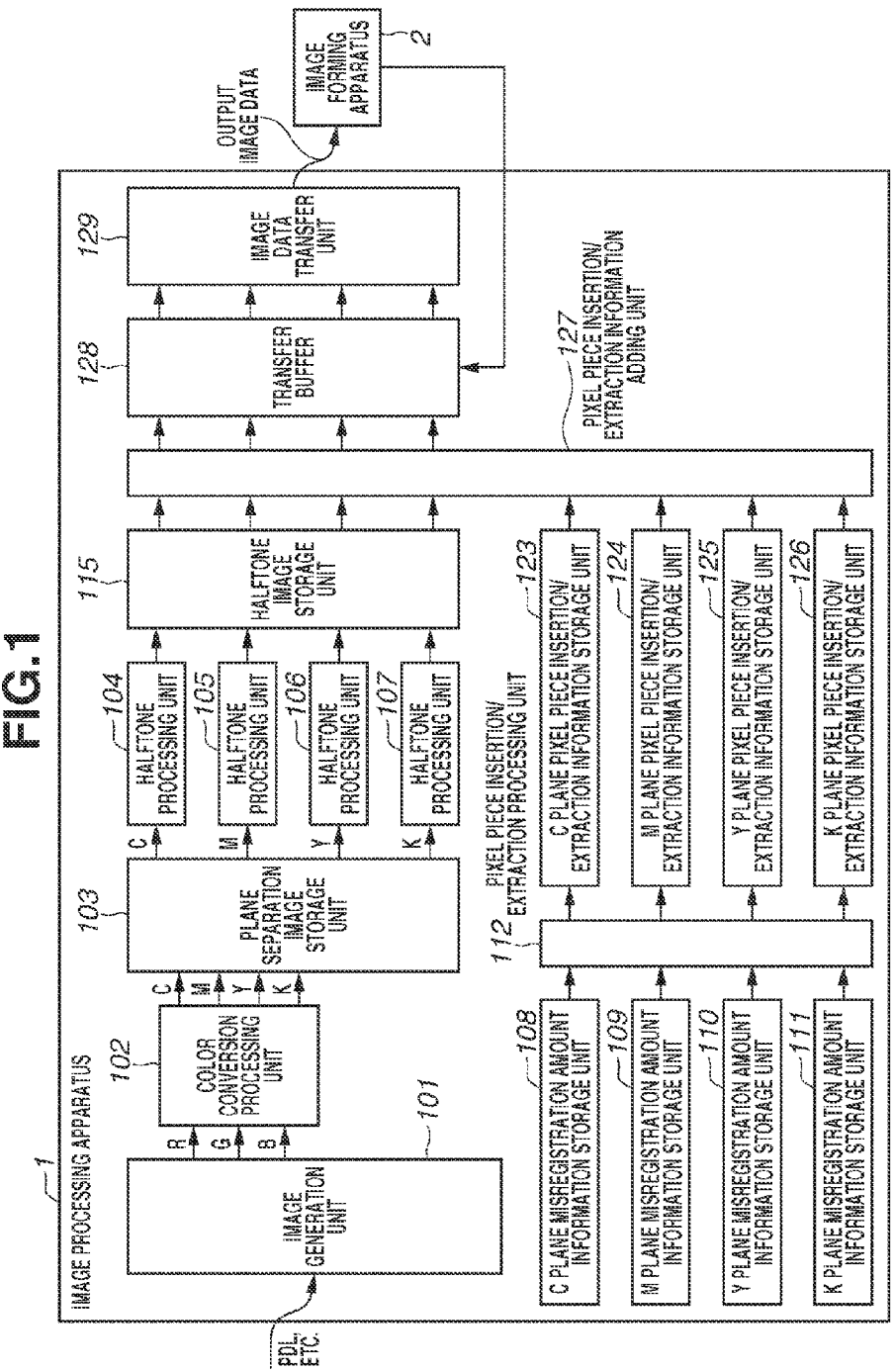
FIG. 1 is a block diagram illustrating an image processing apparatus in detail.
Figure 2:
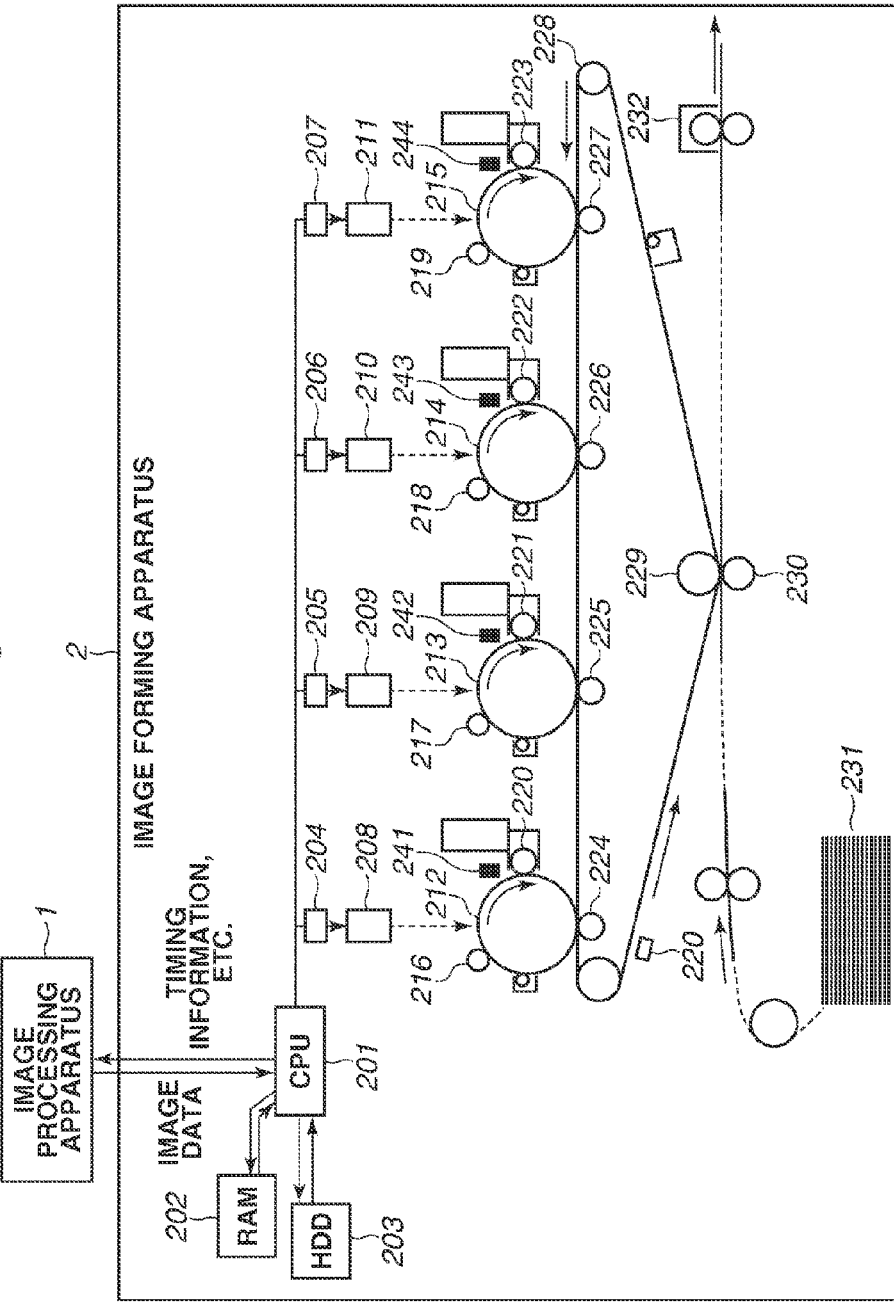
FIG. 2 is a block diagram illustrating an electrophotographic image forming apparatus in detail.

A first exemplary embodiment includes an image forming apparatus configured to form an image on a recording medium through an electrophotographic system and an image processing apparatus configured to convert input image data to image data which the image forming apparatus can output. FIG. 1 is a block diagram illustrating, in detail, the configuration of an image processing apparatus 1, which can be applied to the first exemplary embodiment. FIG. 2 is a block diagram illustrating, in detail, the configuration of an image forming apparatus 2, which can be applied to the first exemplary embodiment. The image processing apparatus 1 and the image forming apparatus 2 are interconnected through an interface or a circuit. The image processing apparatus 1 is, for example, a printer driver that is installed in a typical personal computer. In that case, each unit in the image processing apparatus 1 to be described hereinafter is realized by the computer executing a predetermined program. Alternatively, the image forming apparatus 2 may include the image processing apparatus 1.

[Image Forming Apparatus and Image Formation]

With reference to FIG. 2, the image forming apparatus 2 includes a central processing unit (CPU) 201 that receives image data from the image processing apparatus 1, a random access memory (RAM) 202 serving as a storage, and a hard disk drive (HDD) 203. The image forming apparatus 2 forms an image with coloring materials in four colors, namely, cyan (C), magenta (M), yellow (Y), and black (K). The image forming apparatus 2 according to the first exemplary embodiment is a tandem type and includes image forming units corresponding to the respective colors. Each of the image forming units forms independently an image of a single color. Each of the image forming units includes, primarily, a light source, an exposure device, a photosensitive drum serving as an image carrying member, a charging device, and a developing device. Hereinafter, image formation through the electrophotographic system will be described. Photosensitive drums 212, 213, 214, and 215 are charged to predetermined potentials by charging devices 216, 217, 218, and 219, respectively. The potentials of the photosensitive drums 212 to 215 are measured, respectively, by electrometers 241, 242, 243, and 244, which are disposed to face the respective photosensitive drums 212 to 215, and thus the potentials of the charges by the charging devices 216 to 219 are controlled to the predetermined potentials.

2. Exposure Process

Drive units 204, 205, 206, and 207 modulate the image data obtained from the CPU 201 into exposure signals and drive respective exposure units 208, 209, 210, and 211 based on the respective exposure signals. The exposure units 208 to 211 expose the respective photosensitive drums 212 to 215 to form electrostatic latent images on the respective photosensitive drums 212 to 215.

FIG. 5 is a schematic diagram illustrating an optical system that includes a drive unit and an exposure unit. Although an optical system that includes the drive unit 204 and the exposure unit 208 will be described as an example, the remaining optical systems respectively including the drive units 205 to 207 and the exposure units 209 to 211 have a similar configuration to that described hereinafter. The drive unit 204 includes a laser driver 310, an intensity detection photodetector (hereinafter, PD sensor) 304, and a beam position detection photodetector (hereinafter, BD sensor) 306. The PD sensor 304 detects the intensity of a laser beam to control an exposure amount. The BD sensor 306 detects the position of the laser beam to control the beginning of an exposure. The exposure unit 208 includes a multibeam laser element 301, a collimator lens 302, a polygon mirror 305, and an Fθ lens 307.

First, the multibeam laser element 301, which includes eight luminous points arrayed one-dimensionally, is driven to emit a laser beam. The laser beam is expanded by the collimator lens 302 and is reflected by a surface of the rotating polygon mirror 305 to carry out a moving scan. Upon detecting the laser beam carrying out the moving scan, the BD sensor 306 generates a writing start signal and transmits the writing start signal to the CPU 201. The CPU 201, when a predetermined amount of time elapses after receiving the writing start signal, transmits image data to the laser driver 310. The laser driver 310 modulates the image data to obtain an exposure signal and drives the multibeam laser element 301 according to the exposure signal. Thus, an electrostatic latent image is formed on a photosensitive drum 309. The laser driver 310 according to the first exemplary embodiment controls insertion or extraction of a pixel piece (hereinafter, also referred to as pixel piece insertion/extraction) on a pixel-by-pixel basis according to image data. Details thereof will be described later.

3. Toner Developing Process

Referring back to FIG. 2, toner is caused to adhere to the electrostatic latent images formed on the respective photosensitive drums 212 to 215 by developing devices 220, 221, 222, and 223, respectively, and thus toner images are formed.

4. Transfer Process

Voltages are applied to electroconductive rollers 224, 225, 226, and 227 serving as transfer units, and thus the toner images on the respective photosensitive drums 212 to 215 undergo primary transfers onto a transfer belt 228 at contact portions between the photosensitive drums 212 to 215 and the transfer belt 228. The CMYK toner images are sequentially formed, in synchronization with one another, on the transfer belt 228, and thus a color toner image is formed thereon. Thereafter, a voltage is applied to a secondary transfer roller 229, and thus the color toner image undergoes a secondary transfer onto a recording medium 230 at a secondary transfer nip where the transfer belt 228 comes in contact with the recording medium 230.

5. Fixing Process

The recording medium 230, on which the color toner image has been formed, is conveyed to a fixing unit 232. The fixing unit 232, which has been heated, applies heat and pressure onto the recording medium 230 and the toner image on the recording medium 230 to fuse and fix the toner image to the recording medium 230.

6. Paper Discharging Process

Lastly, the recording medium 230, on which the color image has been formed, is sent to a discharge unit 231 and is discharged from the image forming apparatus 2. Thus, image formation through the electrophotographic system is completed in the image forming apparatus 2.

[Image Processing Apparatus]

Referring back to FIG. 1, each of the configurations in the image processing apparatus 1 will now be described. Upon receiving a printer description language (PDL) serving as an image output command from an external device (not illustrated), the image processing apparatus 1 carries out image processing on image data obtained from the PDL. Then, the image processing apparatus 1 transmits the image data to the image forming apparatus 2. The image processing apparatus 1 includes an image generation unit 101, a color conversion processing unit 102, a plane separation image storage unit 103, halftone processing units 104 to 107, and a halftone image storage unit 115. The image processing apparatus 1 further includes misregistration amount information storage units 108 to 111 for the respective colors, a pixel piece insertion/extraction processing unit 112, pixel piece insertion/extraction information storage units 123 to 126 for the respective colors, a pixel piece insertion/extraction information adding unit 127, a transfer buffer 128, and an image data transfer unit 129.

The image generation unit 101 rasterizes the received PDL and generates image data of red (R), green (G), and blue (B). The generated RGB image data is transmitted to the color conversion processing unit 102.

The color conversion processing unit 102 converts the RGB image data received from the image generation unit 101 to image data corresponding to the coloring materials included in the image forming apparatus 2. In this example, the color conversion processing unit 102 converts the RGB image data to respective pieces of image data corresponding to cyan (C), magenta (M), yellow (Y), and black (K). The color conversion processing unit 102 then stores the respective pieces of image data corresponding to CMYK into the plane separation image storage unit 103.

The halftone processing units 104, 105, 106, and 107 provided for the respective colors carry out halftone processing on the respective pieces of image data corresponding to the respective colors, which has been subjected to color conversion, received from the plane separation image storage unit 103. Although the halftone processing units 104 to 107 are provided for the respective colors in this example, a halftone processing unit may be shared instead. In that case, pieces of the image data respectively corresponding to CMYK are sequentially transmitted to the common halftone processing unit, in which halftone processing may be carried out under given conditions for the respective colors. The halftone processing units 104 to 107 output, to the halftone image storage unit 115, halftone image data for the respective colors that has been obtained through the halftone processing.

The C plane misregistration amount information storage unit 108, the M plane misregistration amount information storage unit 109, the Y plane misregistration amount information storage unit 110, and the K plane misregistration amount information storage unit 111 retain misregistration amount tables for the respective colors, and the pixel piece insertion/extraction processing unit 112 carries out pixel piece insertion/extraction processing using the misregistration amount tables on a pixel-by-pixel basis. As a result, a pixel piece insertion/extraction flag, serving as pixel piece insertion/extraction information, indicating whether a pixel piece needs to be inserted or extracted is generated for each pixel. The pixel piece insertion/extraction flags obtained for the respective pixels by the pixel piece insertion/extraction processing unit 112 are stored, respectively, in the C plane pixel piece insertion/extraction information storage unit 123, the M plane pixel piece insertion/extraction information storage unit 124, the Y plane pixel piece insertion/extraction information storage unit 125, and the K plane pixel piece insertion/extraction information storage unit 126. The misregistration amount tables and the pixel piece insertion/extraction processing will be described later in detail.

The pixel piece insertion/extraction information adding unit 127 adds the pixel piece insertion/extraction information to the respective pieces of halftone image data corresponding to CMYK that is stored in the halftone image storage unit 115. The halftone image data, to which the pixel piece insertion/extraction information has been added, is then output to the transfer buffer 128 and is transferred to the image forming apparatus 2 through the image data transfer unit 129.

Figure 4A:
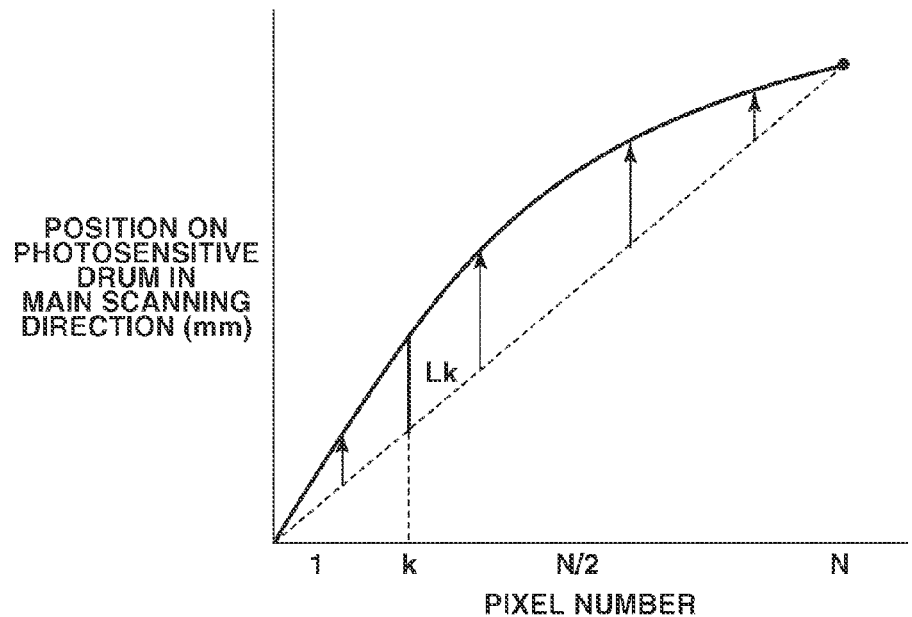
FIGS. 4A and 4B are diagrams for describing a misregistration amount table.
Figure 4B:
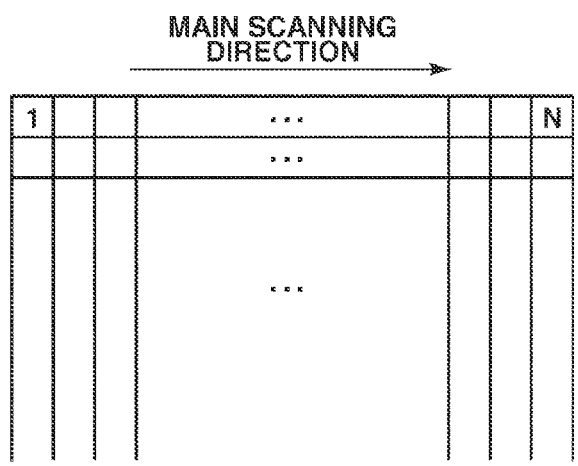

The misregistration amount table will now be described. FIG. 4A illustrates a misregistration amount table. The "misregistration amount" in this example refers to an amount by which a given pixel in image data is misregistered in the main scanning direction from a position where that pixel is supposed to be located. In FIG. 4A, the horizontal axis indicates a pixel number (see FIG. 4B) in image data, and the vertical axis indicates a position on a photosensitive drum. The positions of the pixels in the image data are associated with the positions on the photosensitive drum in the main scanning direction so that an image is formed on the photosensitive drum across a desired width. Here, the exposure start position on the photosensitive drum is designed to match a pixel having a pixel number 1 in the image data, and the exposure end position on the photosensitive drum is designed to match a pixel having a pixel number N in the image data. The dotted line obtained by connecting the aforementioned two positions corresponds to the target positions on the photosensitive drum for the respective pixel numbers. In the first exemplary embodiment, exposure is controlled sequentially starting from the pixel number 1, and an image is written on the photosensitive drum.

In reality, when a photosensitive drum is exposed, actual positions of the pixels in image data do not match the corresponding target positions on the photosensitive drum, resulting in a state indicated by a solid curved line, for example. This is because an error in the exposure width in the main scanning direction occurs in each pixel, and thus the optical magnification in the main scanning direction (i.e., the main scanning magnification) varies on a pixel-by-pixel basis. In the example illustrated in FIG. 4A, the main scanning magnification varies differently between the pixels in the left half (i.e., pixels ranging from the pixel number 1 corresponding to the exposure start to the pixel number N/2) and the pixels in the right half (i.e., pixels ranging from the pixel number N/2 to the pixel number N corresponding to the exposure end). In the left half, as the scan proceeds, the distances between the actual positions of the pixels and the corresponding target positions in the main scanning direction gradually increase, and the misregistration amount increases accordingly. Since the exposure starts from the pixel with the pixel number 1, a misregistration amount Lk at a pixel with a pixel number k is one in which the variations in the main scanning magnification of the pixel number 1 to the pixel number k−1 have been accumulated. Accordingly, the pixels in the left half, in which the misregistration amount continues to increase, each have a main scanning magnification of greater than 100%, and thus the photosensitive drum is exposed across a width that is greater than the target exposure width. Meanwhile, for the pixels in the right half, the misregistration amounts gradually decrease as the scan proceeds. Accordingly, the pixels in the right half, in which the misregistration amount continues to decrease, each have a main scanning magnification of less than 100%, and thus the photosensitive drum is exposed across a width that is smaller than the target exposure width.

With such a misregistration amount table as the one illustrated in FIG. 4A, when a pixel number is input, a difference between an actual exposure position and the corresponding target position on a photosensitive drum can be read out as a misregistration amount L.

In the first exemplary embodiment, such misregistration amount tables are retained for the respective colors. Since image forming units are provided independently for the respective colors, the misregistration amount tables typically differ among the respective colors. One misregistration amount table is retained for each color based on the assumption that the main scanning magnification varies equally in the sub-scanning direction (i.e., rotation direction of the photosensitive drum). If it is found that the main scanning magnification varies differently in the sub-scanning direction, a plurality of misregistration amount tables may be retained for each color, and a misregistration amount table may be selected according to a position along the sub-scanning direction. In the first exemplary embodiment, misregistration amount tables are generated based on measurement results obtained by exposing photosensitive drums and measuring the main scanning magnifications thereon at the time of manufacture.

Subsequently, pixel piece insertion/extraction determination processing by the pixel piece insertion/extraction processing unit 112 will be described in detail. FIG. 3 is a flowchart of the pixel piece insertion/extraction determination processing. In the pixel piece insertion/extraction determination processing, the pixel piece insertion/extraction processing unit 112 generates a pixel piece insertion/extraction flag indicating whether a pixel piece needs to be inserted or extracted. The pixel piece insertion/extraction flag is used when the laser driver 310 generates an exposure signal. Although processing on cyan image data will be described as an example, similar processing can be carried out on each piece of MYK image data. The term "pixel piece insertion/extraction" refers to insertion or deletion of a pixel piece.

In step S100, the pixel piece insertion/extraction processing unit 112 obtains a misregistration amount table stored in the C plane misregistration amount information storage unit 108.

In step S101, the pixel piece insertion/extraction processing unit 112 initializes a cumulative adjustment amount. The cumulative adjustment amount is a cumulative value of exposure widths adjusted in the main scanning direction by inserting or extracting a pixel piece in or from each of the pixels ranging from the pixel number 1 to the pixel number k. Since no adjustment amount has been accumulated at the beginning of a scan on a given main scanning line, the cumulative adjustment amount is initialized to 0.

In step S102, the pixel piece insertion/extraction processing unit 112 initializes a variable for the pixel number.

In step S103, the pixel piece insertion/extraction processing unit 112 determines whether a pixel piece is to be deleted from a pixel of interest so that the pixel of interest is exposed on the photosensitive drum at the target position. Specifically, the pixel piece insertion/extraction processing unit 112 first obtains, from the misregistration amount table, a misregistration amount Lk of the pixel k of interest from the target position on the main scanning line. The pixel piece insertion/extraction processing unit 112 then determines whether a pixel piece needs to be deleted, based on Expression (1) below.

$$\text{(misregistration amount from target position on main scanning line+cumulative adjustment amount)} > \text{pixel piece length}/2 \quad (1)$$

Since the main scanning width has been adjusted up to the pixel immediately preceding the pixel k of interest through insertion or extraction of pixel pieces, the misregistration amount of the pixel k of interest is less than the misregistration amount illustrated in FIG. 4A, where the adjustment is not made. Therefore, the left side of Expression (1) indicates an estimated misregistration amount of the pixel k of interest from the target position on the photosensitive drum if the main scanning magnifications of the pixels to be exposed theretofore have been adjusted by inserting or extracting pixel pieces. The pixel piece insertion/extraction processing unit 112 determines whether the estimated misregistration amount is greater than one-half of the length of a pixel piece to be deleted.

If, in step S103, the pixel piece insertion/extraction processing unit 112 determines that the estimated misregistration amount from the target position on the photosensitive drum is greater than one-half of the length of a pixel piece to be deleted, based on Expression (1) (YES in step S103), then in step S104, the pixel piece insertion/extraction processing unit 112 determines to delete a pixel piece and proceeds to step S108. Meanwhile, if the estimated misregistration amount from the target position on the photosensitive drum is less than or equal to one-half of the length of a pixel piece to be deleted (NO in step S103), the pixel piece insertion/extraction processing unit 112 determines not to delete a pixel piece and proceeds to step S105.

In step S105, the pixel piece insertion/extraction processing unit 112 then determines whether a pixel piece is to be inserted into the pixel k of interest so that the pixel k of interest is exposed on the photosensitive drum at the target position. Specifically, the pixel piece insertion/extraction processing unit 112 determines whether a pixel piece is to be inserted, based on Expression (2) below.

$$\text{(misregistration amount from target position on main scanning line+cumulative adjustment amount)} < -\text{(pixel piece length}/2) \quad (2)$$

Similarly to Expression (1), the left side of Expression (2) indicates an estimated misregistration amount of the pixel k of interest from the target position on the photosensitive drum if the main scanning magnifications of the pixels to be exposed theretofore have been adjusted by inserting or extracting pixel pieces. If the estimated misregistration amount from the target position on the photosensitive drum is less than negative one-half of the length of a pixel piece to be inserted (YES in step S105), then in step S106, the pixel piece insertion/extraction processing unit 112 determines to insert a pixel piece and proceeds to step S108. Meanwhile, if the estimated misregistration amount from the target position on the photosensitive drum is greater than or equal to negative one-half of the length of a pixel piece to be inserted (NO in step S105), then in step S107, the pixel piece insertion/extraction processing unit 112 determines not to insert a pixel piece and proceeds to step S108.

In step S108, the pixel piece insertion/extraction processing unit 112 stores, in the C plane pixel piece insertion/extraction information storage unit 123, a pixel piece insertion/extraction flag regarding the pixel k of interest, based on the determination results in step S103 and in step S105. If, in step S104, the pixel piece insertion/extraction processing unit 112 has determined to delete a pixel piece, the pixel piece insertion/extraction processing unit 112 stores a negative value in the C plane pixel piece insertion/extraction information storage unit 123 as pixel piece insertion/extraction information on the pixel k of interest. If, in step S106, the pixel piece insertion/extraction processing unit 112 has determined to insert a pixel piece, the pixel piece insertion/extraction processing unit 112 stores a positive value in the C plane pixel piece insertion/extraction information storage unit 123 as pixel piece insertion/extraction information on the pixel k of interest. Otherwise, i.e., if the pixel piece insertion/extraction processing unit 112 has determined not to insert or delete a pixel piece, the pixel piece insertion/extraction processing unit 112 stores 0 as the pixel piece insertion/extraction information on the pixel k of interest.

In step S109, the pixel piece insertion/extraction processing unit 112 updates the cumulative adjustment amount. If the pixel piece insertion/extraction processing unit 112 has determined to insert a pixel piece, an increase in position due to the insertion of the pixel piece is added to the cumulative adjustment amount. Meanwhile, if the pixel piece insertion/extraction processing unit 112 has determined to delete a pixel piece, a decrease in position due to the deletion of the pixel piece is subtracted from the cumulative adjustment amount.

In step S110, the pixel piece insertion/extraction processing unit 112 determines whether the processing has been completed up to the pixel number N on the main scanning line. If the processing has not been completed (NO in step S110), the pixel piece insertion/extraction processing unit 112 proceeds to step S111. In step S111, the pixel piece insertion/extraction processing unit 112 increments the pixel number and then return to step S103. Meanwhile, if the processing has been completed up to the pixel number N on the main scanning line (YES in step S110), the pixel piece insertion/extraction processing unit 112 terminates the processing on the current main scanning line. The pixel piece insertion/extraction processing unit 112 carries out the processing described above on the entire main scanning lines that form the image data. Thus, the pixel piece insertion/extraction determination processing is completed.

Referring back to FIG. 1, the pixel piece insertion/extraction information adding unit 127 reads, from the halftone image storage unit 115, a pixel value of each pixel included in image data. The pixel value indicates the original exposure width of each pixel. The pixel piece insertion/extraction information adding unit 127 then adds, to each pixel, pixel piece insertion/extraction information obtained from the pixel piece insertion/extraction information storage units 123 to 126 for the respective colors and generates output image data, in which the pixel value and the pixel piece insertion/extraction information for each pixel are contained in a predetermined format. The output image data is stored in the transfer buffer 128 for transmitting data to an engine unit. Thereafter, the image data transfer unit 129 transmits the output image data stored in the transfer buffer 128 to the image forming apparatus 2 in synchronization with an image formation timing signal transmitted from the image forming apparatus 2.

(Pixel Piece Insertion/Extraction Control)

The laser driver 310 (see FIG. 5) in the image forming apparatus 2 controls actual insertion or extraction of pixel pieces based on the output image data, in which pixel piece insertion/extraction information has been added to each pixel. As described above, the laser driver 310 modulates the received output image data into an exposure signal and drives the multibeam laser element 301. The laser driver 310 generates an exposure signal that allows adjustment of a main scanning width when a single pixel is exposed. Such an adjustment is made by inserting or deleting a pixel piece on a pixel-by-pixel basis according to the pixel piece insertion/extraction information. In particular, in the first exemplary embodiment, an adjustment pixel piece for deleting a pixel piece is provided. The adjustment pixel piece is a blank pixel piece and is also referred to as an adjustment blank pixel piece, hereinafter. If the pixel piece insertion/extraction information on a given pixel of interest indicates a negative value, the laser driver 310 skips reading the adjustment pixel piece to thus reduce the optical magnification of the pixel of interest. Meanwhile, if the pixel piece insertion/extraction information on the pixel of interest indicates a positive value, the laser driver 310 inserts a pixel piece into the pixel of interest to thus enlarge the optical magnification of the pixel of interest. In other words, in the first exemplary embodiment, the number of clock signals corresponding to a single pixel differs at different positions along the main scanning direction. The number of clock signals is increased for a pixel where the main scanning magnification is increased, and the number of clock signals is reduced for a pixel where the main scanning magnification is reduced.

In this manner, in the first exemplary embodiment, the optical magnification in the main scanning direction is adjusted by inserting or deleting a pixel piece on a pixel-by-pixel basis. In this case, an adjustment blank pixel piece is preset in each pixel, and the adjustment blank pixel piece is deleted when a pixel piece needs to be deleted to adjust the main scanning magnification. This configuration allows the main scanning magnification to be corrected without producing moire.

Figure 6:
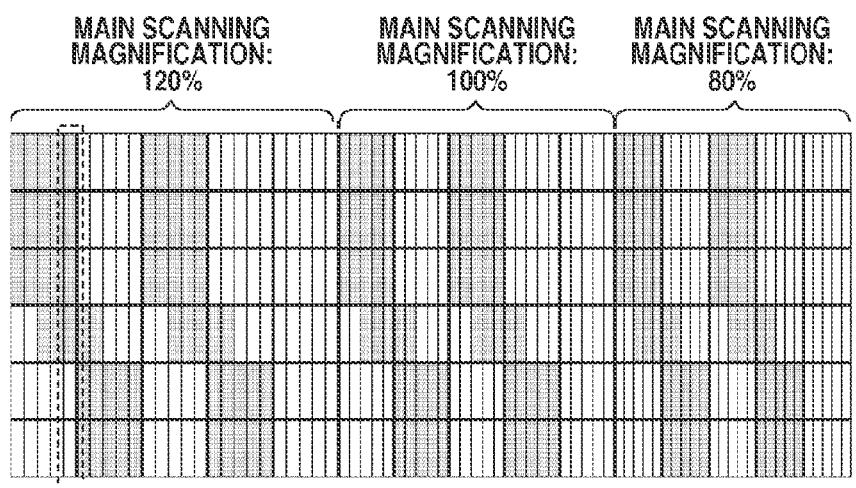
FIG. 6 illustrates exemplary image data.

Hereinafter, a processing result to be obtained in the first exemplary embodiment will be described. FIG. 6 schematically illustrates an exemplary result to be obtained by exposing image data, and six vertical lines are depicted for a single pixel. The pulse width in the image forming apparatus 2 corresponds to one-fifth of a single pixel. In other words, a single pixel corresponds to five pixel pieces (pulse widths). The five pixels from the left each have a main scanning magnification of 120%, and the main scanning width (exposure width) of each pixel is greater than a target value. Thus, the main scanning width is reduced by deleting a pixel piece. The five pixels in the middle each have a main scanning magnification of 100% and do not require any adjustment of the main scanning width through insertion or extraction of pixel pieces. The five pixels in the right each have a main scanning magnification of 80%, and the main scanning width is less than the target value. Thus, a pixel piece is inserted into each of the pixels to adjust the main scanning width.

Figure 7:
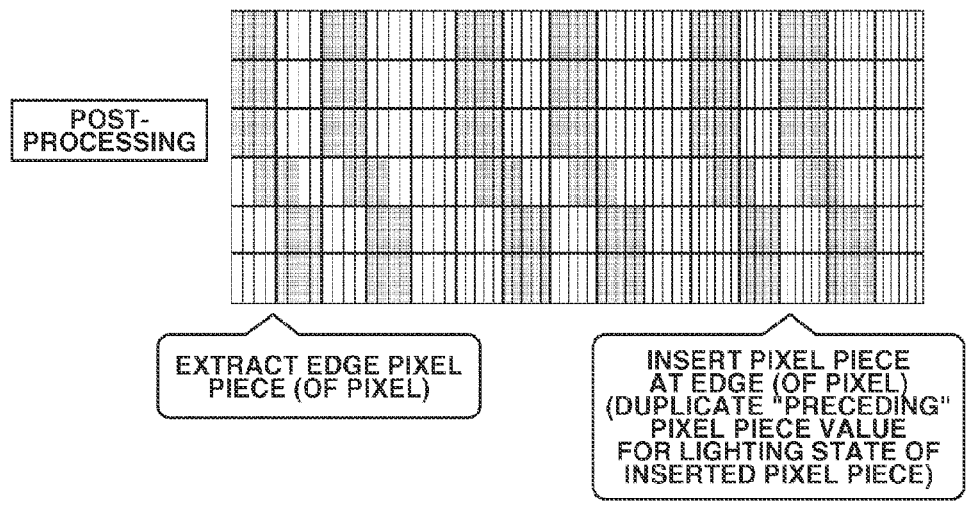
FIG. 7 schematically illustrates a processing result obtained when a pixel piece is inserted or extracted without an adjustment blank pixel piece being prepared.

A case where such pixel piece insertion/extraction processing as described above is carried out without an adjustment blank pixel piece being prepared in each pixel will now be considered. Note that prior to inserting a pixel piece, it is previously determined which is to be inserted, a blank pixel piece or a lit pixel piece. More specifically, the lighting state of a pixel piece to be inserted is the same as that of the preceding pixel piece in the scanning direction. FIG. 7 schematically illustrates an exposure result to be obtained if a pixel piece is inserted or extracted into or from the image data illustrated in FIG. 6 without an adjustment blank pixel piece being prepared in each pixel. In the left side region, the vertical lines each formed by a single pixel (five pixel pieces) are reduced to include four pixel pieces, and in the right side region, the vertical lines each formed by five pixel pieces are increased to include six pixel pieces. The resultant vertical lines are exposed with an exposure amount different from that of the original vertical lines formed by lighting five pixel pieces, and thus the output density corresponding to the pixel values differs among the respective regions.

Table 1 illustrates variations in the exposure amount on pixels when a pixel piece is inserted or extracted without an adjustment blank pixel piece being prepared for each pixel.

TABLE 1

|  | exposure amount when a blank pixel piece is used | exposure amount when a lit pixel piece is used |
|---|---|---|
| pixel piece inserted | no variation | increase |
| pixel piece deleted | no variation | decrease |

As illustrated above, inserting or deleting a lit pixel piece leads to a variation in the exposure amount of the pixel. In particular, if a pixel piece is to be deleted, a lit pixel piece may need to be deleted from a pixel where the entire pixel pieces are lit, and thus a reduction in the exposure amount caused by the deletion of a lit pixel piece is hard to avoid.

Of course, such a variation in the output density or interference with an image pattern occurs not only in a pixel in which the entire pixel pieces are lit but also in any pixel in which a certain number of pixel pieces are lit. That is because the linearity of the relationship between the pixel value and the exposure intensity varies on a pixel-by-pixel basis. FIGS. 8A, 8B, and 8C are diagrams for describing variations in the linearity. FIG. 8A illustrates the relationship between the pixel value and the exposure intensity when a pixel piece is deleted, and FIG. 8C illustrates the relationship between the pixel value and the exposure intensity when a pixel piece is inserted. FIG. 8B illustrates the relationship between the pixel value and the exposure intensity when the main scanning width is not adjusted. Each of the pixel values is set to have the range of values from 0/5 to 5/5 according to the pulse width of the image forming apparatus 2. Normally, a linear relationship is present between the pixel value and the exposure intensity, as illustrated in FIG. 8B. When a pixel piece is inserted or extracted, however, the relationship between the pixel value and the exposure intensity becomes nonlinear, as illustrated in FIGS. 8A and 8C. Furthermore, the linearity of the relationship between the pixel value and the exposure intensity illustrated in FIG. 8A differs from the linearity illustrated in FIG. 8C. Such a variation in the linearity of the relationship between the pixel value and the exposure intensity results in a defective image such as pseudo-contours or moire.

Accordingly, in the first exemplary embodiment, an adjustment blank pixel piece is provided for each pixel. Thus, the main scanning width is reduced by deleting the adjustment blank pixel piece if the optical magnification is enlarged, or a blank pixel piece is inserted into a pixel where the optical magnification is reduced.

FIG. 9 schematically illustrates exposure control in the first exemplary embodiment. Among the five pixel pieces forming a single pixel, the right edge pixel piece is set as an adjustment blank pixel piece. That is, in the first exemplary embodiment, a maximum exposure amount of a single pixel is obtained when four pixel pieces are lit. In the five pixels at the left, where the main scanning magnification is enlarged, the main scanning width is reduced by deleting the respective blank pixel pieces. In the five pixels at the right, where the main scanning magnification is reduced, the main scanning width is increased by inserting blank pixel pieces. As a result, as illustrated in FIG. 9, the number of pixel pieces forming the respective vertical lines is four across the pixels, and thus the exposure amounts of the respective pixels can be adjusted uniformly to a predetermined amount.

FIG. 10, as in FIGS. 8A, 8B, and 8C, illustrates the relationship between the pixel value and the exposure amount in each of the cases where a pixel piece is deleted, where no processing is carried out, and where a pixel piece is inserted. As can be seen from FIG. 10, the linearity of the relationship between the pixel value and the exposure intensity stays constant in all the cases. In the first exemplary embodiment, as described above, while the number of clock signals for a single pixel differs on different positions along the main scanning direction, the maximum number of clock signals corresponding to lit pixel pieces among the clock signals for a single pixel stays constant across all the positions along the main scanning direction. Accordingly, pseudo-contours or moire caused by local variations in the linearity of the relationship between the pixel value and the exposure amount can be reduced. Although the pixel values are set to range from 0/5 to 5/5 in FIG. 10, image data having pixel values ranging from 0/4 to 4/4 may be generated by reducing a gradation of pixel values for an adjustment blank pixel piece.

In the first exemplary embodiment, an adjustment blank pixel piece is prepared for each pixel, and the main scanning width is adjusted by deleting the adjustment blank pixel piece if the main scanning magnification is enlarged. As a result, the number of gradations that can be expressed by a single pixel decreases. That is, in the exemplary case illustrated in FIG. 10, although a single pixel is originally capable of expressing five gradations, the number of gradations which a single pixel can express is reduced to four in the first exemplary embodiment. Such a reduction in the number of gradations is rarely a significant issue, compared to an advantageous effect that moire due to pixel piece insertion/extraction processing can be fundamentally resolved. Alternatively, moire can be resolved by increasing the frequency of a video clock according to the number of adjustment blank pixel pieces and increasing the number of pixel pieces forming a pixel.

In the first exemplary embodiment, the main scanning magnification is adjusted for each of the coloring materials included in the image forming apparatus 2. In a second exemplary embodiment, the main scanning magnification is adjusted for some of the CMYK coloring materials included in the image forming apparatus 2. In the second exemplary embodiment, as in the first exemplary embodiment, whether to insert or extract a pixel piece is determined based on the measurement value of the main scanning magnification obtained through the adjustment at the time of manufacture, and the main scanning magnification is adjusted accordingly.

In this example, pixel piece insertion/extraction processing is set as follows.

Y: one pixel piece can be inserted or extracted per pixel (total number of pixel pieces: 5)
M: no pixel piece is inserted or extracted (total number of pixel pieces: 5)
C: one pixel piece can be inserted or extracted per pixel (total number of pixel pieces: 5)
K: two pixel pieces can be inserted or extracted per pixel (total number of pixel pieces: 5)

In this manner, different pixel piece insertion/extraction processing settings are configured for each image forming unit provided independently for each of the CMYK colors. An adjustment blank pixel piece is provided for a color in which a variation in the main scanning magnification on the main scanning line is small (e.g., magenta in the image forming apparatus according to the second exemplary embodiment). Such a configuration can prevent a reduction in the number of gradations which a single pixel can express while allowing the pixel piece insertion/extraction processing to be carried out on the other colors appropriately. Thus, occurrence of color moire can be prevented.

In the exemplary embodiments described above, a misregistration amount table is generated based on a measurement result obtained by using an image patch at the time of manufacture, and the generated misregistration amount table is stored in a misregistration amount information storage unit in the image processing apparatus 1. The misregistration amount table is then read for use at the time of forming an image. An exemplary embodiment, however, is not limited thereto. In a third exemplary embodiment, a method for detecting a variation in the main scanning magnification or a misregistration amount among the colors by measuring an output image patch on an intermediate transfer belt using an optical sensor will be described.

In the third exemplary embodiment, a unit for detecting a misregistration amount in the main scanning direction is provided, and a misregistration amount table is dynamically modified. Such a configuration according to the third exemplary embodiment can handle a variation in the main scanning magnification caused by various factors such as product variation or variation with time after manufacture.

Figure 11:
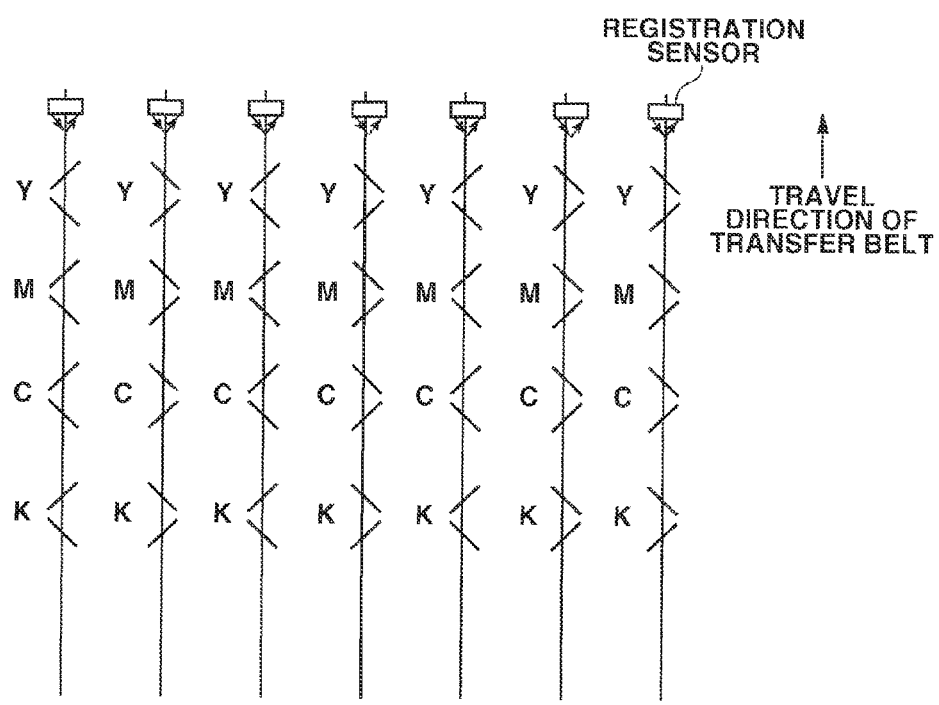
FIG. 11 is a schematic diagram for describing reading performed by a registration sensor for creating a misregistration amount table.

FIG. 11 illustrates a schematic diagram for describing reading performed by a registration sensor for creating a misregistration amount table. A plurality of registration sensors that is capable of reading a position where a registration patch pattern is formed is arranged on a transfer belt in the main scanning direction (i.e., the direction orthogonal to the travel direction of the transfer belt). FIG. 12 illustrates a flowchart of processing for dynamically creating a misregistration amount table. With reference to FIG. 12, misregistration amount table creation processing in the third exemplary embodiment will be described, hereinafter.

In step S200, upon receiving a detection start signal, the image forming unit shifts to a mode in which pixel piece insertion/extraction processing is not carried out. In step S201, the image forming unit forms a predetermined number of registration patch patterns (seven in FIG. 11) on the main scanning line.

In step S203, the registration sensor measures the distances among the registration patch patterns on the transfer belt and associates the measurement results with pixel numbers. The registration sensor then calculates a misregistration amount from the target position in the main scanning direction.

In step S204, the image forming unit interpolates the misregistration amount calculated in step S203 through a cubic curve and creates a misregistration amount table that indicates the pixel numbers and the corresponding misregistration amounts on the photosensitive drum. In step S205, the image forming unit stores the created misregistration amount table in a misregistration amount information storage unit.

Lastly, in step S206, the image forming unit returns to a mode in which pixel piece insertion/extraction processing is carried out.

The misregistration amount table creation processing may be carried out when the power supply is turned on or activated, at a predetermined time interval, or at a predetermined page count interval, or may be carried out (automatically) according to a calibration result or at a given timing through a user operation.

The third exemplary embodiment is not limited to the misregistration amount table creation processing including the reading of registration patch pattern positions on a transfer belt. Alternatively, an image patch printed on a recording medium may be measured using a reader or a scanner. As described thus far, a configuration in which a variation in the main scanning magnification is dynamically measured after manufacture to set the pixel piece insertion/extraction processing can yield an effect similar to that of the third exemplary embodiment.

In the exemplary embodiments described above, whether a pixel piece needs to be inserted or extracted is determined on a pixel-by-pixel basis. In a fourth exemplary embodiment, such a determination is not made on a pixel-by-pixel basis. Instead, pixel piece insertion/extraction determination processing that uses a pixel piece insertion/extraction flag table according to main scanning position information will be described. FIG. 13 is a block diagram illustrating the configuration of an image processing apparatus 1, which can be applied to the fourth exemplary embodiment. Configurations that are similar to those of the first exemplary embodiment are given identical reference numerals, and descriptions thereof will be omitted.

In the fourth exemplary embodiment, a pixel piece insertion/extraction flag is determined in accordance with main scanning position information indicating main scanning positions on a photosensitive drum. The pixel piece insertion/extraction information adding unit 127 reads a pixel piece insertion/extraction flag corresponding to a given pixel number from a pixel piece insertion/extraction flag table for halftone image data obtained from the halftone image storage unit 115. Such a configuration can simplify the pixel piece insertion/extraction processing, and at the same time, can reduce defects caused by correcting scanning magnification, such as image density unevenness or moire, by using adjustment blank pixel pieces.

In the exemplary embodiments described above, the main scanning magnification is adjusted by using a pixel piece that corresponds to a pulse width of the image forming apparatus 2. The length of a pixel piece, however, does not need to correspond to the pulse width which the image forming apparatus 2 can generate.

An exemplary embodiment can also be realized by supplying, to a system or a device, a storage medium on which computer program codes for software that realize the functions of the exemplary embodiments described above are recorded. In this case, a computer (or a CPU, a microprocessing unit (MPU), etc.) of the system or the device reads out the program codes stored in the computer readable storage medium and executes the program codes to realize the functions of the exemplary embodiments described above.

According to the exemplary embodiments, the main scanning magnification of image data can be corrected without generating moire in forming an image.

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-263130 filed Nov. 30, 2012, which is hereby incorporated by reference herein in its entirety.

What is claimed is:

1. A control device for controlling an image forming apparatus configured to form an image, the control device comprising:
    an acquisition unit configured to acquire image data formed by pixels each including a plurality of pixel pieces, and pixel piece insertion/extraction information indicating whether a pixel piece needs to be inserted into or extracted from each pixel of the image data;
    a generation unit configured to generate an exposure signal used by the image forming apparatus to carry out an exposure, according to a pixel value indicating a pixel of interest in the image data and to pixel piece insertion/extraction information on the pixel of interest; and
    a control unit configured to control exposure by the image forming apparatus according to the exposure signal,
    wherein the generation unit causes the pixel of interest to be formed by a plurality of pixel pieces arranged in a direction in which the image forming apparatus performs exposure scanning, and presets at least one of the plurality of pixel pieces as an adjustment pixel piece that stays blank, and
    wherein the generation unit extracts the adjustment pixel piece when the width of the pixel of interest in the scanning direction is to be reduced.

2. The control device according to claim 1, wherein the generation unit inserts a blank pixel piece among the set pixel pieces when the width of the pixel of interest in the scanning direction is to be increased.

3. The control device according to claim 1, further comprising:
a misregistration amount information acquisition unit configured to acquire misregistration amount information indicating a misregistration amount from a target position in a main scanning direction in the image forming apparatus; and
an adding unit configured to determine whether a pixel piece needs to be inserted into or extracted from each pixel of the image data, based on the misregistration amount information acquired by the misregistration amount information acquisition unit, and to add the pixel piece insertion/extraction information to the image data,
wherein the acquisition unit acquires the image data to which the pixel piece insertion/extraction information has been added by the adding unit.

4. The control device according to claim 3, wherein the adding unit determines whether a pixel piece needs to be inserted or extracted, for each color included in the image forming apparatus.

5. The control device according to claim 3, wherein the adding unit determines whether a pixel piece needs to be inserted or extracted, using a table that indicates whether a pixel piece needs to be inserted or extracted at each position on a photosensitive drum included in the image forming apparatus.

6. The control device according to claim 3, further comprising:
a modification unit configured to modify a method by which the adding unit determines whether a pixel piece needs to be inserted or extracted.

7. The control device according to claim 3, further comprising:
a detection unit configured to detect a result obtained by the image forming apparatus outputting a registration patch pattern; and
a calculation unit configured to calculate the misregistration amount information based on the result of the detection by the detection unit.

8. The control device according to claim 1, wherein the length of the pixel piece corresponds to a pulse width that can be output from an exposure unit.

9. An image forming apparatus configured to form an image using an electrophotographic method, in which an exposure unit exposes and scans a photosensitive drum to form an image, the image forming apparatus comprising:
a generation unit configured to generate a signal for driving the exposure unit according to image data; and
a drive unit configured to drive the exposure unit according to the signal,
wherein the signal has a different number of clock signals corresponding to a single pixel included in the image data at different positions on the photosensitive drum, and
wherein a maximum number of clock signals corresponding to lit pixel pieces among the clock signals for a single pixel is constant across all the positions on the photosensitive drum.

10. A control method for controlling an image forming apparatus configured to form an image, the control method comprising:
acquiring image data formed by pixels each including a plurality of pixel pieces, and pixel piece insertion/extraction information indicating whether a pixel piece needs to be inserted into or extracted from each pixel of the image data;
generating an exposure signal to be used by the image forming apparatus to carry out an exposure, according to a pixel value indicating a pixel of interest in the image data and to pixel piece insertion/extraction information on the pixel of interest; and
controlling exposure by the image forming apparatus according to the exposure signal,
wherein the generating of the exposure signal causes the pixel of interest to be formed by a plurality of pixel pieces arranged in a direction in which the image forming apparatus performs exposure scanning, and presets at least one of the plurality of pixel pieces as an adjustment pixel piece that stays blank, and
wherein the adjustment pixel piece is extracted when the width of the pixel of interest in the scanning direction is to be reduced.

11. A control method for controlling an image forming apparatus configured to form an image using an electrophotographic method, in which an exposure unit exposes and scans a photosensitive drum to form an image, the control method comprising:
generating a signal for driving the exposure unit according to image data; and
driving the exposure unit according to the signal,
wherein the signal has a different number of clock signals corresponding to a single pixel included in the image data at different positions on the photosensitive drum, and
wherein a maximum number of clock signals corresponding to lit pixel pieces among the clock signals for a single pixel is constant across all the positions on the photosensitive drum.

12. A non-transitory computer-readable storage medium storing a computer program that, when loaded and executed by a computer, causes the computer to function as the control device according to claim 1.

13. A non-transitory computer-readable storage medium storing a computer program that, when loaded and executed by a computer, causes the computer to function as the image forming apparatus according to claim 9.

* * * * *